(12) United States Patent
Walker (10) Patent No.: US 7,528,767 B2
(45) Date of Patent: May 5, 2009

(54) VARIABLE RATIO POWER DIVIDER FOR A DUAL POLARIZATION RADAR SYSTEM WITH AUTOMATIC BUILT-IN TEST EQUIPMENT AND CALIBRATION

(75) Inventor: William H. Walker, Madison, AL (US)

(73) Assignee: Baron Services, Inc., Huntsville, AL (US)

( * ) Notice: Subject to any disclaimer, the term of this patent is extended or adjusted under 35 U.S.C. 154(b) by 0 days.

(21) Appl. No.: 11/952,692

(22) Filed: Dec. 7, 2007

(65) Prior Publication Data

US 2008/0224921 A1    Sep. 18, 2008

Related U.S. Application Data

(63) Continuation-in-part of application No. 11/941,905, filed on Nov. 16, 2007.

(60) Provisional application No. 60/906,730, filed on Mar. 13, 2007.

(51) Int. Cl.
*G01S 7/40* (2006.01)
(52) U.S. Cl. ........................ 342/174; 342/188
(58) Field of Classification Search ............... 342/173, 342/174, 188
See application file for complete search history.

(56) References Cited

U.S. PATENT DOCUMENTS

| | | | | |
|---|---|---|---|---|
| 3,581,242 A | * | 5/1971 | Lavedan | 333/1 |
| 4,106,015 A | * | 8/1978 | Beguin et al. | 342/89 |
| 4,310,813 A | * | 1/1982 | Yuuki et al. | 333/117 |
| 5,376,939 A | * | 12/1994 | Urkowitz | 342/134 |
| 5,583,515 A | * | 12/1996 | Marumoto | 342/361 |
| 7,345,625 B1 | * | 3/2008 | Urkowitz | 342/174 |
| 2006/0284768 A1 | * | 12/2006 | Pauplis | 342/368 |
| 2007/0152867 A1 | * | 7/2007 | Randall | 342/26 R |
| 2007/0222661 A1 | * | 9/2007 | Stagliano et al. | 342/26 R |
| 2008/0224919 A1 | * | 9/2008 | Walker | 342/174 |
| 2008/0224920 A1 | * | 9/2008 | Walker | 342/174 |
| 2008/0224921 A1 | * | 9/2008 | Walker | 342/174 |

* cited by examiner

*Primary Examiner*—John B Sotomayor
(74) *Attorney, Agent, or Firm*—David E. Mixon; Frank M. Caprio; Bradley Arant Boult Cummings LLP (57) ABSTRACT

A variable ratio power divider (VRPD) used for adjusting a calibration signal for a dual polarization radar system has been developed. The VRPD includes an input line that receives a calibration signal and splits the calibration signal into two separate test signals that have a 0° phase shift between them. The VRPD also includes a horizontal polarization output port for a horizontal calibration signal and a vertical polarization output port for a vertical calibration signal. A waveguide switch receives one of the test signals. If the waveguide switch is operating in an open position, it passes the test signal through a variable 0°-180° phase shifter. This evenly divides the power of the test signals between the horizontal and vertical output ports. If the waveguide switch is operating in a closed position, it causes the test signal to bypass the phase shifter so that the entire power of the both test signals is directed entirely to either the horizontal phase output port or the vertical phase output port.

8 Claims, 6 Drawing Sheets

FIG. 6

VARIABLE RATIO POWER DIVIDER FOR A DUAL POLARIZATION RADAR SYSTEM WITH AUTOMATIC BUILT-IN TEST EQUIPMENT AND CALIBRATION

CROSS-REFERENCE TO RELATED APPLICATIONS

This application is a continuation-in-part application of U.S. patent application Ser. No. 11/941,905 entitled "System and Method for Dual Polarization Radar with Automatic Built-In Test Equipment and Calibration" that was filed on Nov. 16, 2007 which claims priority from U.S. Provisional Patent Application No. 60/906,730 entitled "System and Method for Dual Polarization Radar with Automatic Built-In Test Equipment and Calibration" that was filed on Mar. 13, 2007.

FIELD OF THE INVENTION

The present invention relates generally to the field of radar systems. More particularly, the invention provides a system and method for dual polarization weather radar with automatic built-in test and calibration capabilities.

BACKGROUND ART

Dual polarization radar systems, also known as polarimetric radar, offer advantages over conventional radar in many ways. In addition to detecting storms and measuring radial wind velocities, polarimetric radar has been proven by scientists to be the superior radar instrument for measurement of rainfall rate (accumulation) and to determine the classification of hydrometeors, such as wet snow, dry snow, small hail, large hail, graupel, light rain and heavy rain. Many polarimetric radar systems have been developed and fielded by scientists as instruments to study atmospheric sciences, and now some commercial weather radar users such as television stations are employing polarimetric radar to more accurately measure weather phenomena and to warn the general public of inclement weather.

Testing and calibration of dual polarization radar instruments have been major difficulties with polarimetric radar. One prior art method for polarimetric calibration is performed by "bird bathing" the antenna (i.e., directing the antenna straight up into the atmosphere) at a time when light-to-medium strataform rainfall covers the radar site. Because rain drops are almost perfect spheroids, they provide almost equal backscatter to all radar polarizations (HV/HH=HH/HV). A disadvantage of this prior art calibration method is that it can only be performed during a period of light-to-medium strataform rainfall at the radar site, and cannot therefore be performed on a regular or as-needed basis.

Another prior art calibration method trains the radar antenna on the sun, which radiates equal amounts of energy in all polarizations. This method is commonly called "sun tracking" or "sun calibration." With this method, HH/HV HV/HH, except that this measurement only measures the received signals without regard to the balance of the transmitted signal. A disadvantage of the sun tracking method of calibration is that there are only short periods of time during each day that the sun is positioned such that an accurate calibration of the receiver can be made.

It would be desirable to have system and method for calibration of dual polarization radar that overcomes the disadvantages of the prior art methods. More specifically, it would be desirable to have method and system for calibrating the receiver that can be performed at regular intervals or at any desired time. Another challenge with dual polarization radar is balancing the power on the horizontal and vertical transmit channels. It would be desirable to have built-in test equipment that adjusts for unequal losses in the horizontal and vertical transmit channels and provides equal power output to both polarizations.

SUMMARY OF THE INVENTION

In some aspects, the invention relates to a variable ratio power divider used for adjusting a calibration signal for a dual polarization radar system, comprising: an input line that receives a calibration signal and splits the calibration signal into a first test signal and a second test signal, where the test signals have a 0° phase shift; a horizontal polarization output port for a horizontal calibration signal; a vertical polarization output port for a vertical calibration signal; a waveguide switch that receives the first test signal; where the waveguide switch may be configured to operate in an open position and pass the first test signal through a variable 0°-180° phase shifter so that the power of the first and second test signals is evenly divided between the horizontal polarization output port and the vertical polarization output port; and where the waveguide switch may be configured to operate in a closed position and cause the first test signal to bypass the variable 0°-180° phase shifter so that the entire power of the first and second test signals is directed entirely to either the horizontal polarization output port or the vertical polarization output port.

Other aspects and advantages of the invention will be apparent from the following description and the appended claims.

BRIEF DESCRIPTION OF DRAWINGS

It should be noted that identical features in different drawings are shown with the same reference numeral.

DETAILED DESCRIPTION

The present invention provides a system and method for reliable, built-in calibration and testing of dual polarization radar systems. The present invention achieves this object with a unique calibration method in which both the balance of the transmitted energy and the balance of the received energy can be measured precisely and accounted for in the constants of the radar signal processor. This calibration can be done at regular intervals and at any time of day. The invention provides for the absolute balance of power of the transmitted signals. The invention also provides for "closed loop" testing of the receiver by simulating polarimetric radar signals and injecting the signals into the antenna. Consequently, the present invention enables the radar system to "self calibrate" without the use of any external test equipment and in a fashion that the radar can function, calibrate and test in the manner of a remotely located "robot."

Figure 2:
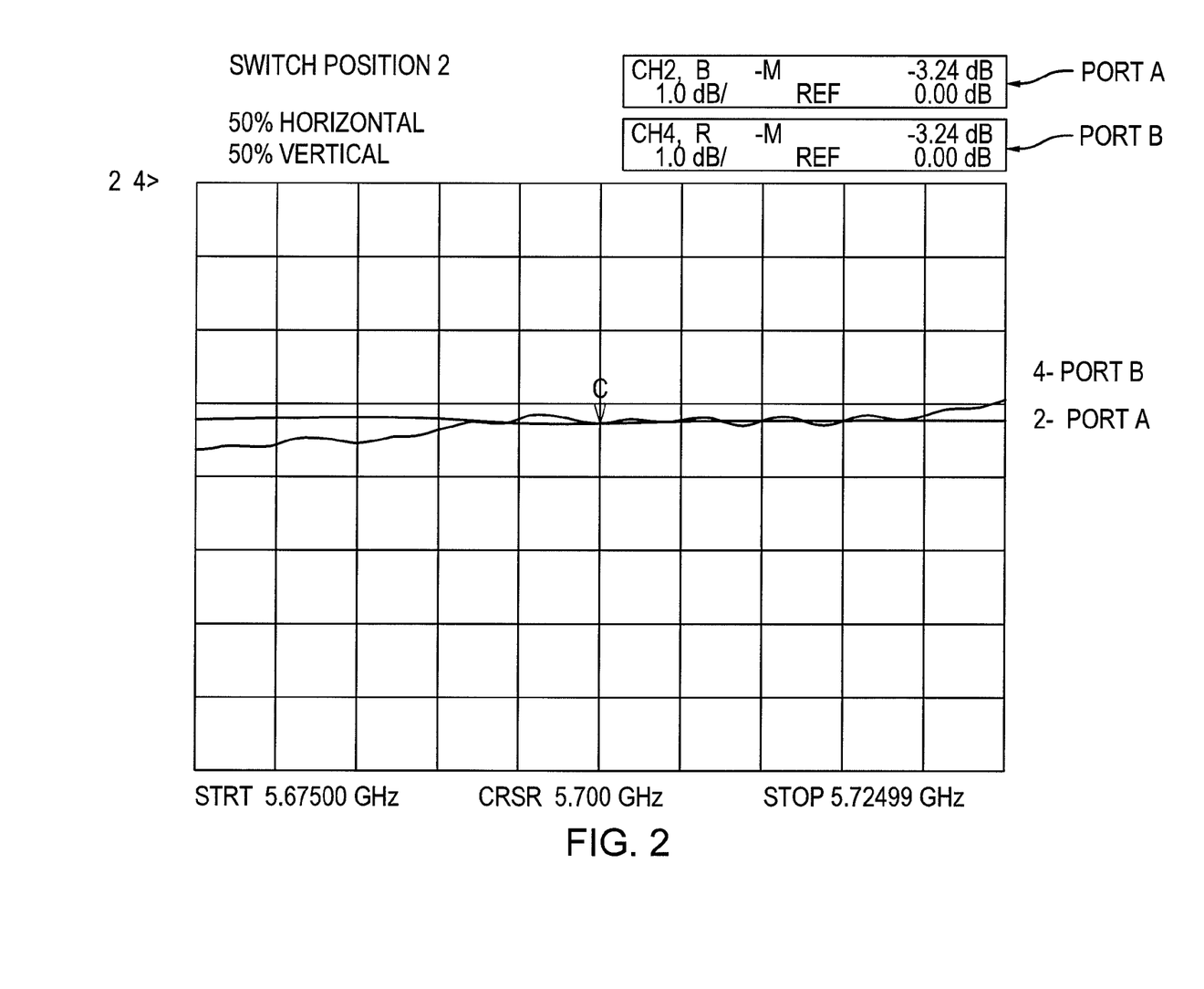
FIG. 2 is a graphical plot of the power output when the horizontal and vertical transmit channels are balanced according to one embodiment of the present invention.
Figure 3:
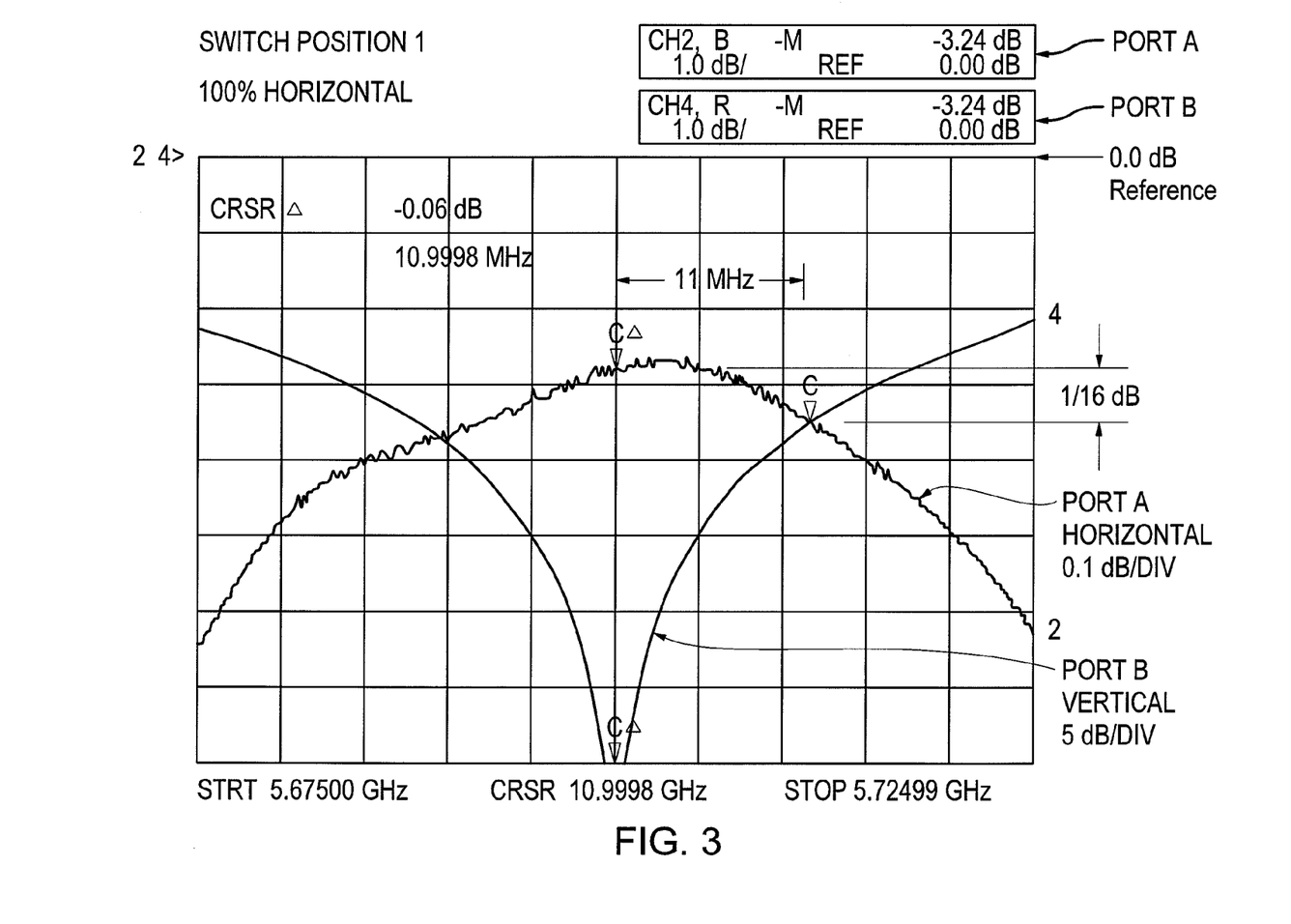
FIG. 3 is a graphical plot showing the power output when 100% of the power is applied to the horizontal transmit channel.

The invention includes a variable ratio power divider that provides the ability to completely balance the transmitted power in the horizontally- and vertically-polarized channels by shifting and combining the two phases of microwave signals. Test results, shown in FIG. 2 and FIG. 3, demonstrate the vertically and horizontally transmitted power balance obtained is better than 1120th of a decibel. Specifically, FIG. 2 is a plot of the power output when the horizontal and vertical transmit channels are balanced. FIG. 3 is a plot showing the power output when 100% of the power is applied to the horizontal transmit channel. The power measurement is only limited by the accuracy of the test points and laboratory test equipment employed in the measurement.

The invention also includes a "snippet circuit" that obtains a short snippet or sample (e.g., 30 to 100 meters in width) of the transmitter sample pulse to use as a transmitter phase burst pulse, or "lock pulse." The normal polarimetric radar system transmits pulses ranging in width from approximately 100 meters to several hundreds of meters. A short snippet of the transmitter pulse is captured and saved to be used as a reference for comparison with the received transmission. Using the snippet circuit, the system can self-measure the phase droop or phase delay across the remainder of the transmitted pulse.

Figure 1:
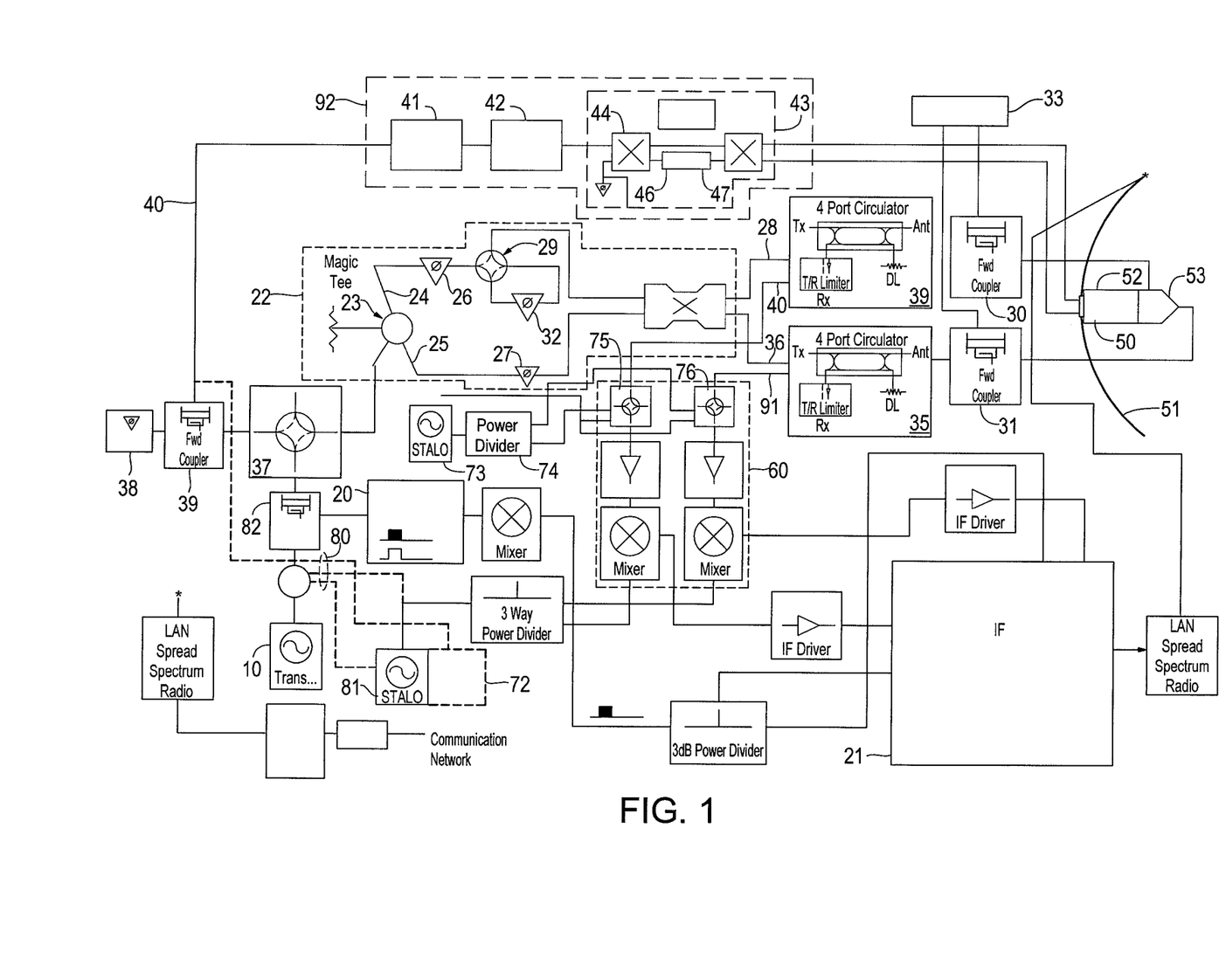
FIG. 1 is a schematic representation of the components of a system according to one embodiment of the present invention.

FIG. 1 is a schematic representation of one embodiment of a dual polarization radar according to the present invention. In a coherent radar system, a STALO 81 signal would be sent upstairs (i.e., above the rotary coupler, not illustrated) and would be used to convert the signals to an IF frequency. The transmitted signal would come from transmitter 10 through forward coupler 82 to sample port 20 where a very short snippet of the transmitted pulse would be "picked off." For example, for a transmitted pulse that is 300 meters wide, the user may choose to snip off the first 30 or 40 meters of the transmission pulse. The "snipped" signal would be transmitted to the IF digitizer 21 to set up a reference for development of Doppler signals.

The remaining pulse would pass through waveguide switch 37 and then through Variable Ratio Power Divider ("VRPD") circuit 22 en route to the antenna. The VRPD circuit 22 splits the signal two ways in a zero-degree phase relationship. One arm 24 of the VRPD circuit 22 contains a 90 degree phase shifter 26. The other arm 25 of the VRPD circuit 22 contains a variable phase shifter 27 capable of varying the phase from zero to 180 degrees.

If the signals in arms 24 and 25 of the VRPD circuit 22 are in phase, they will come out arm 28 on the VPRD and go on to transmit in horizontal polarization. The waveguide switch 29 can be activated to put an additional 90 degree phase shift (via phase shifter 32) in the signal in arm 24 of the VRPD circuit 22. Then the phase shifter 32 can be adjusted to equally divide the signal measured at ports 30 and 31 feeding the H and V ports on the antenna. For example, with a 750 kilowatt transmitter, all of the signal could be transmitted through the horizontal, or 375 kilowatts could be transmitted through each of the horizontal and vertical, with the phase shifter 32 allowing a precise balance. Another component of the built-in test equipment is a dual-sensor peak power meter 33 that is reading the transmitted power down to the third digit, a very accurate level of measurement.

One of the problems in conventional dual polarization radar is that once the power is divided, there is no way to balance the power. So if the losses inherent in components on the horizontal channel (such as 4-port circulator 34 and couplers 30) are different from the losses in components on the vertical channel (such as 4-port circulator 35 and coupler 31), then unequal power is transmitted. The present invention achieves the goal of transmitting exactly equal power on the vertical and horizontal channels.

Signals sent from the radar would go out and propagate out in space and would hit some type of weather event and the radar would receive backscattered energy from the weather event. The backscattered energy will be captured by the radar signals that are reflected to the dish 51 back to the feed 53. The signals travel through individual vertical and horizontal channels 90 and 91 respectively, and down through receiver 60 where they are amplified and then to the IF digitizer 21 where they are digitized and compared with the snippet that was transmitted to the IF digitizer earlier.

When comparing the snippet with the received signal, the different phase shifts in the signal represent velocity. The width of the spectrum represents turbulence. The amount of signal in each channel represents the amount of rainfall or reflectivity. The signal also provides information regarding the shape of the raindrop and whether it is frozen or unfrozen, because all that energy is on the reflected signal coming back in.

In the present invention, the signals are simulated by taking the transmitted signal from transmitter 10 and activating waveguide switch 37 to switch from the normal path of transmit (through the VRPD circuit 22) over to a dummy load 38 via directional coupler 39. Then, a small portion of the transmitted signal is directed through leg 40 into calibration circuit 92. Optionally, this signal path may also employ a microwave delay line to delay the pulse. For example, if the transmitted signal is 750 kilowatts in the dummy load, 20 milliwatts (typical value) of this signal could be directed out of the directional coupler 39 into the calibration circuit 92 through leg 40. In the calibration circuit 92, the signal can be modified in phase and amplitude, and can be transmitted from test signal antenna 50 mounted in the vertex of the radar antenna 51.

The test antenna is centered at the vertex of the radar antenna in such a position that it falls within the shadow of the operational antenna feed, which consists of an Orthomode Transducer or multi-mode (polarization diverse, multiple simultaneous polarizations or variable polarizations) antenna feed assembly. The test antenna is used to radiate a small low level signal directly to the normal antenna feed. The calibration circuit is mounted on the antenna above the rotary coupler in a fashion similar to the AN/FPS-16, AN/MPS-T9, M-33, NIKE and numerous other Military radar systems that have been around for many years. In some cases, the stable local oscillator ("STALO") and/or reference clock are mounted below the rotary coupler.

The invention includes a built in test point to accept the full transmitted pulse width and power and an associated calibration circuit that extracts a portion of the signal and manipulates the signal such that the signature in phase and amplitude are representative of what is found in backscattered energy from a meteorological hydrometeor. In other words, the invention can simulate microwave backscatter that exists in weather conditions of interest to the user. The calibration circuit then transmits these signals from a test antenna to the main antenna feed.

The test signal antenna 50 is in the shadow 52 of the feed 53 and therefore does not affect the overall performance of the radar antenna 51 as far as side lobes and distortion of the beam, so it has no effect on the normal radar operations. In the calibration circuit 92, various components and circuitry are used to modify the signal to take on characteristics simulating attributes of various weather phenomena, such as $Z_{DR}$, PHV, $\phi_{DP}$ and $K_{DP}$, where:

$Z_{DR}$=differential reflectivity;
PHV (Rho$_{HV}$)=H-V correlation coefficient;
$\phi_{DP}$ (PHI$_{DP}$)=differential propagation phase; and
KDp =phase differential with distance or specific phase differential that is used to estimate the amount of precipitation in the scanned volume of atmosphere.

For example, step attenuator 41 can be adjusted to attenuate the signal to simulate rainfall intensity or reflectivity. The resultant signal can be transmitted through test antenna 50 into the feed 53 and received through normal circuitry via receiver 60. Then the amount of attenuation received could be measured to calibrate the reflectivity of the radar (i.e., to test that the reflectivity range of the radar and accuracy are within specification). Attenuator 41 can then be set back to zero.

The calibration circuit 92 also contains a digital phase shifter 42 that can be used to impose a Doppler phase shift in the signal. The signal can then be transmitted from test signal antenna 50 into the feed 53 and back through the normal channels to the receiver 60 and the Doppler velocity would be read out in the equipment below in the normal radar.

Using digital phase shifter 42, a very noisy sine wave can be imposed on the signal instead of a pure sine wave, in order to widen the spectrum. Using multiple frequencies mixed together, the Gaussian distribution of the waveform can be expanded. The velocity of the spectrum width can be simulated by the modulation of the phase shifter, by the way the signals are serrodyning.

Another feature of calibration circuit 92 is the digital beam forming circuit 43, which is very similar to VRPD circuit 22, except that the digital beam forming circuit is made with coaxial components and uses low microwave power (e.g., 1 milliWatt) instead of high power (e.g., 200 Watts). In the digital beam forming circuit 43, the signals coming out of a 90 degree hybrid coupler 44 are in phase, and on one arm 45 of the circuit 43, a constant length of transmission line provides a fixed phase from coupler 44 to coupler 48. On arm 46 of the circuit 43, instead of having a phase shifter as in the VRPD circuit 22 for the high power transmission, there is a low power digital phase shifter 47. Using the low power digital phase shifter 47, the phases that are recombining in this part of the digital beam forming circuit 43 can be varied. If the phases are in phase, the signal goes out the "H" port 70. If they are 90 degrees out of phase, the signal goes out the "V" port 71. If they are 45 degrees out of phase, the signal goes out of both ports. By changing the phase in the low power digital phase shifter 47, a phase lag can be imposed on one channel or the other. This phase lag can be used to simulate other characteristics of a received weather event signal, such as $K_{dp}$ and Phi$_{dp}$. Therefore, by controlling the phase shifter 47, different phases and amplitudes can be generated. In fact, the phase shifter 47 can be serrodyned and the phases will actually "roll" the polarization or generate a circular polarization.

The resultant signals are transmitted by the test antenna 50, are received by the main antenna feed 53, come back through the normal processing to receiver 60, and the radar can be calibrated using the received signals. In operation, each different characteristic is simulated and the system is calibrated for that characteristic one at a time, and all of the characteristics can be tested in as little as ten seconds. With the radar doing a volumetric scan, the system can be programmed to calibrate the radar fully at the end of the each scan. For a non-coherent radar system, the transmission signals are generated via the up-converter option 72, then "pumped" into the same circuit as the coherent radar, discussed above. As shown in FIG. 1, dotted lines 80 illustrate a system used for a non-coherent radar.

The system according to the present invention also includes a digital noise source 73 and a power divider 74 that will, through coax switches 75 and 76, provide a noise signal into the receiver to check each channel and subsequently allow calibration of the transmitter of the system. This is an alternative calibration of the receiver similar to the sun-tracking calibration. Using the system and method according to the present invention, the transmitted power signal can be completely balanced during the calibration process. Further, the receiver calibration system and method disclosed herein can simulate "bird bathing" of the radar antenna by amplitude modulation and phase modulation, by polarization modulation, and imposition of RF phase lead/lag in the beam forming network.

Figure 4:
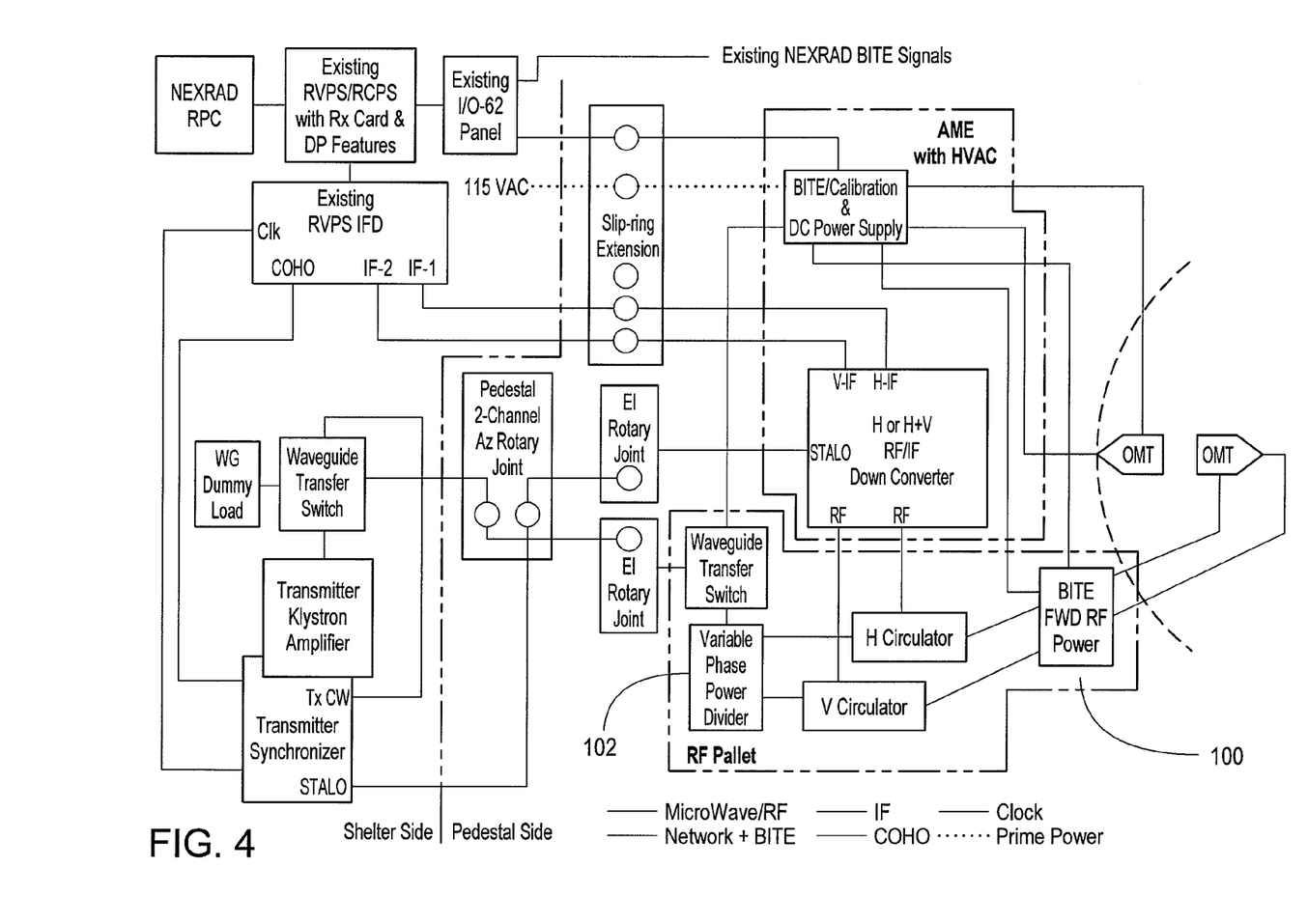
FIG. 4 is a block diagram representation of the system with built in calibration components according to one embodiment of the present invention.
Figure 5:
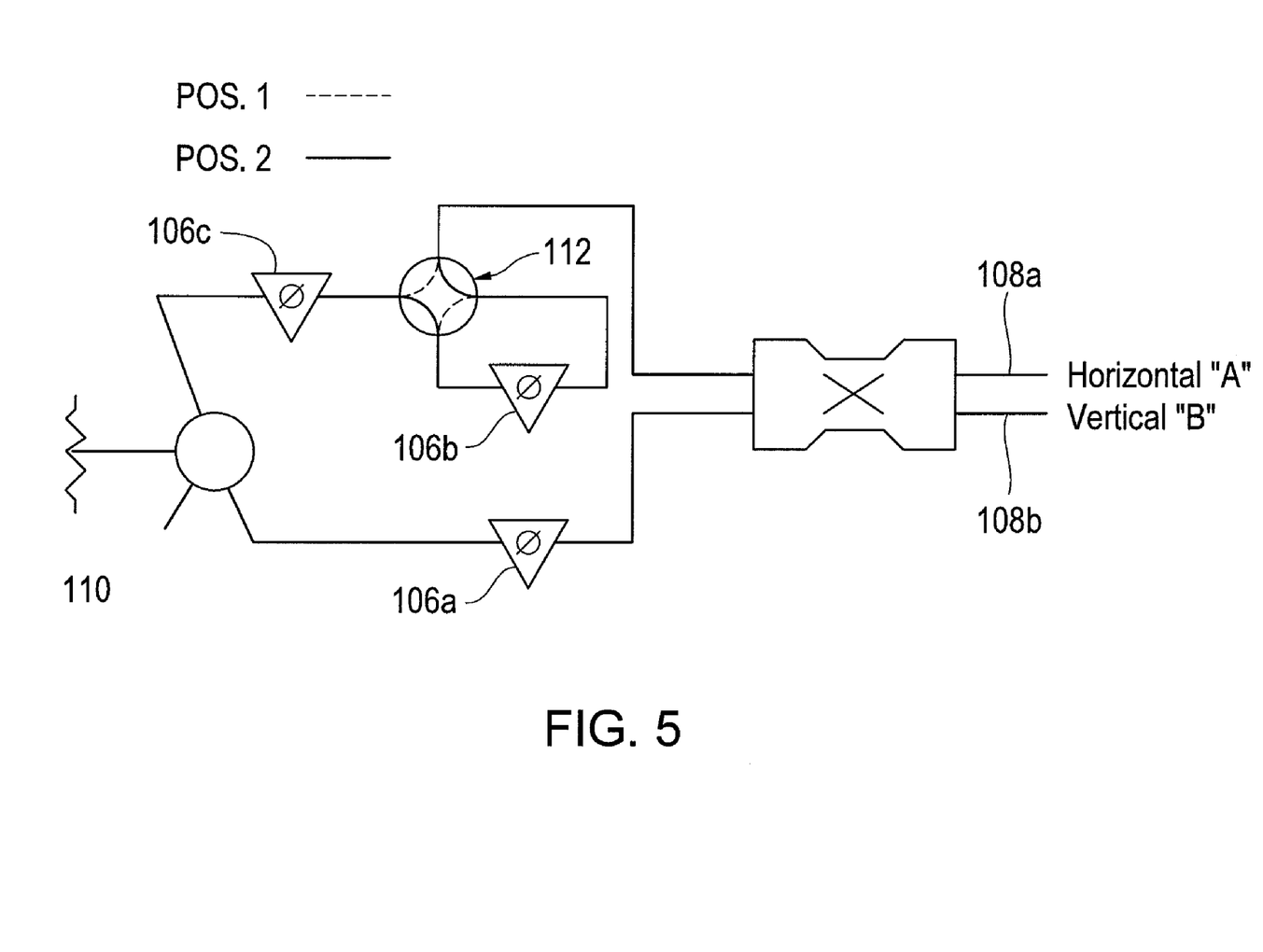
FIG. 5 is a schematic representation of the Variable Ratio Power Divider circuit according to one embodiment of the present invention.
Figure 6:
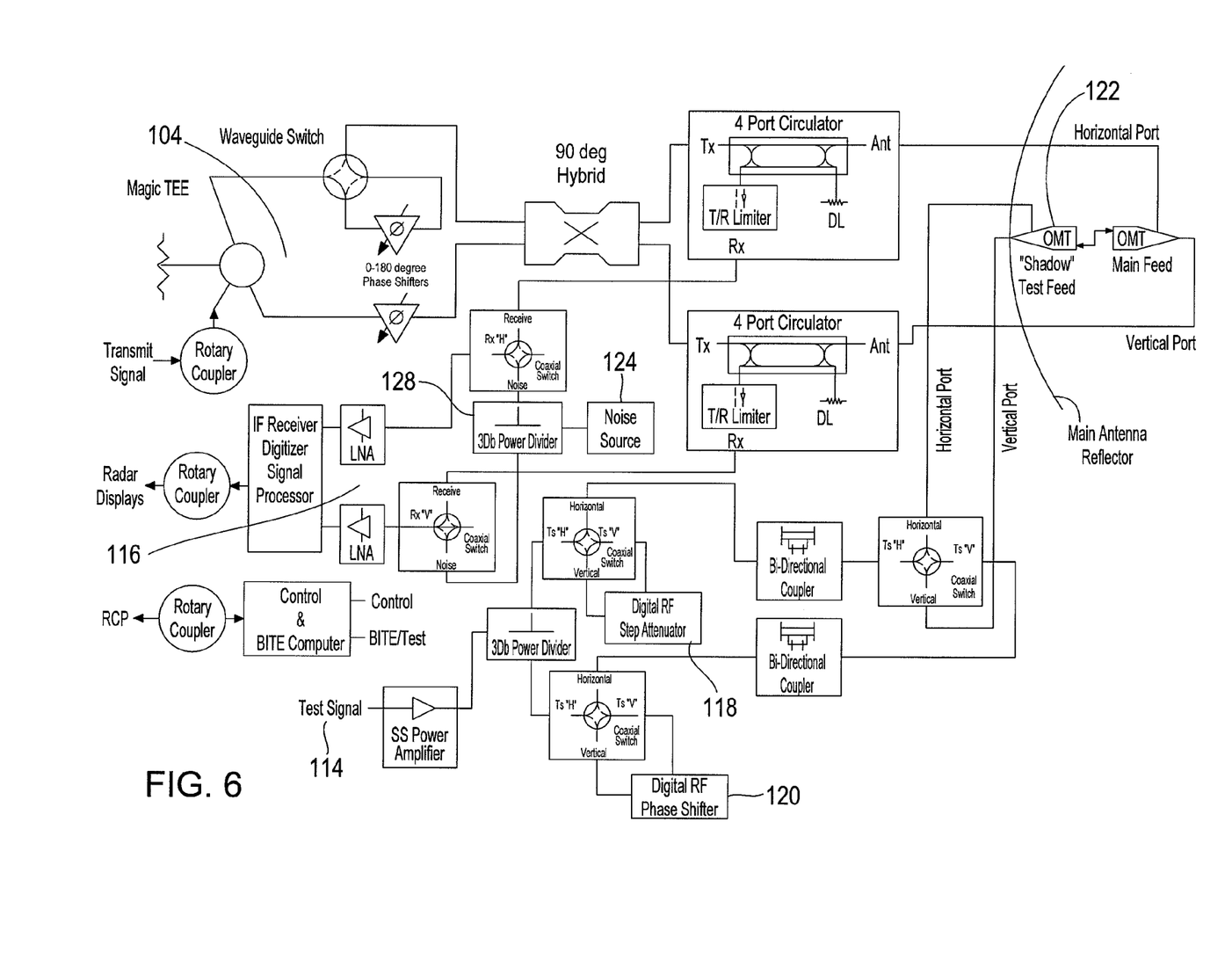
FIG. 6 is a schematic representation of the components of a system for an alternative embodiment of the present invention.

FIG. 4 shows a block diagram of one example of the present invention a built in calibration system 100. The calibration system 100 includes a Variable Ratio Power Divider (VPRD) 102 that is similar to the VRPD 22 previously described and shown in FIG. 1. FIG. 5 shows a detailed schematic 104 of the VRPD. The VRPD as shown in FIG. 4 and FIG. 6 uses separate 0-180° adjustable phase shifters 106*a*, 106*b* and 106*c*. For a full transfer of power to the horizontal output 108*a*, the VRPD targets a 0° phase shift of the input 110. For an equal split power split between horizontal and vertical outputs 108*a* and 108*b*, a 45° phase shift of the input is targeted by the VRPD. For a full transfer of power to the horizontal output 108*b*, the VRPD targets a 90° phase shift between the horizontal and vertical outputs 108*a* and 108*b*. For a full power transfer to either to either the horizontal or vertical outputs 108*a* and 108*b* (with a 0° or a 90° phase shift), the waveguide switch 112 is placed in "position 1" and the signal bypasses a phase shifter 106*b*. For a power split between the horizontal or vertical outputs 108*a* and 108*b* (with a 45° phase shift), the waveguide switch 112 is placed in "position 2" and the signal engages the phase shifter 106*b*. In this example, the signal input 110 from the radar transmitter operates in a frequency range of 2.7-2.9 GHz. The input also operates with a 1000 kW peak pulse and a 1500 W average power levels. The tolerance for power division in $\frac{1}{20}^{th}$ dB.

FIG. 6 shows a schematic of one example of the system that is used to calibrate the receiver of the dual polarization radar system. The system uses two separate methods: attenuation of a test signal; and using simulated background noise in conjunction with a test signal. The method involves sampling a test signal 114 to calibrate the receiver 116 of the system. The test signal may either be a continuous wave or a pulse. The test signal is attenuated or "stepped down" linearly to check both the horizontal and vertical polarizations. This method can be used to simulate various weather conditions (e.g., wind speed) with a digital RF attenuator 118 and digital RF phase shifter 120. This simulates the Doppler shift of the desired weather condition in the horizontal and vertical polarities. Once the test signal is adjusted to the desired conditions, it is transmitted by the test feed 122 to the receiver 116.

The second method of calibrating the receiver involves the use of a recorded level of background atmospheric noise 124. In this example, the background noise has a 30 dB ENR (excess noise ratio). The noise is feed to a 3 dB power divider and the signal power is divided evenly between between the horizontal and vertical changes for a noise level of 27 dB in each channel. This noise level is then feed to the receiver 116 to serve as a calibration signal.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. A variable ratio power divider used for adjusting a calibration signal for a dual polarization radar system, comprising:
   an input line that receives a calibration signal and splits the calibration signal into a first test signal and a second test signal, where the test signals have a 0° phase shift;
   a horizontal polarization output port for a horizontal calibration signal;
   a vertical polarization output port for a vertical calibration signal;
   a waveguide switch that receives the first test signal;
   where the waveguide switch may be configured to operate in an open position and pass the first test signal through a variable 0°-180° phase shifter so that the power of the first and second test signals is evenly divided between the horizontal polarization output port and the vertical polarization output port; and
   where the waveguide switch may be configured to operate in a closed position and cause the first test signal to bypass the variable 0°-180° phase shifter so that the entire power of the first and second test signals is directed entirely to either the horizontal polarization output port or the vertical polarization output port.

2. The variable ratio power divider of claim 1, where the phase shift between the first test signal and the second test signal is 45° when the waveguide switch is operating in the open position.

3. The variable ratio power divider of claim 1, where the calibration signal comprises a pulse wave signal.

4. The variable ratio power divider of claim 1, where the calibration signal comprises a continuous wave signal.

5. The variable ratio power divider of claim 1, where the calibration signal is between 2.7-2.9 GHz.

6. The variable ratio power divider of claim 1, where the calibration signal operates at 1500 watts of average power.

7. The variable ratio power divider of claim 1, where the calibration signal operates at 1000 kilowatts of peak pulse power.

8. The variable ratio power divider of claim 1, where the tolerance for the power division between the first test signal and the second test signal is $\frac{1}{20}$th dB.

* * * * *